United States Patent
Ono et al.

(10) Patent No.: US 10,002,299 B2
(45) Date of Patent: Jun. 19, 2018

(54) INFORMATION PRESENTATION DEVICE, ON-VEHICLE DEVICE, INFORMATION PRESENTATION SYSTEM, AND INFORMATION PRESENTATION METHOD

(71) Applicant: FUJITSU TEN LIMITED, Kobe-shi, Hyogo (JP)

(72) Inventors: Kohei Ono, Kobe (JP); Munenori Maeda, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 47 days.

(21) Appl. No.: 15/186,045

(22) Filed: Jun. 17, 2016

(65) Prior Publication Data

US 2017/0004365 A1    Jan. 5, 2017

(30) Foreign Application Priority Data

Jun. 30, 2015 (JP) .................................. 2015-131985

(51) Int. Cl.
*G08G 1/16* (2006.01)
*G08G 1/00* (2006.01)
(Continued)

(52) U.S. Cl.
CPC .......... *G06K 9/00798* (2013.01); *B60K 35/00* (2013.01); *B60K 37/06* (2013.01);
(Continued)

(58) Field of Classification Search
CPC .. B60W 30/10; B60W 30/14; G06K 9/00798; G06K 2209/23; B60T 2201/08;
(Continued)

(56) References Cited

U.S. PATENT DOCUMENTS

| 6,023,653 A * | 2/2000 | Ichimura ................ G01C 21/30 |
| | | 701/446 |
| 2015/0045986 A1* | 2/2015 | Kan ...................... B60W 40/08 |
| | | 701/1 |

(Continued)

FOREIGN PATENT DOCUMENTS

JP    5389864 B2    1/2014

*Primary Examiner* — Kenny Cese
(74) *Attorney, Agent, or Firm* — Oliff PLC

(57) ABSTRACT

An information presentation device according to embodiment includes acquisition unit, generation unit, and output unit. Acquisition unit acquires information of driving history with respect to driving position in driving lane of vehicle, where information is generated by on-vehicle device based on image captured by imaging device that is mounted on vehicle. Generation unit generates information of graph that indicates transition of positional change of vehicle in driving lane, based on information of driving history acquired by acquisition unit. Output unit outputs information of graph generated by generation unit to display device. Acquisition unit acquires information of driving history that includes distances of right and left edge of driving lane with respect to vehicle. Generation unit generates information of graph based on difference between distances of right and left edge of driving lane with respect to vehicle that is included in information of driving history acquired by acquisition unit.

7 Claims, 13 Drawing Sheets

(51) Int. Cl.
  *G08G 1/123*  (2006.01)
  *B60K 35/00*  (2006.01)
  *B60K 37/06*  (2006.01)
  *G06K 9/00*  (2006.01)

(52) U.S. Cl.
  CPC ...... *B60K 2350/2013* (2013.01); *G08G 1/123* (2013.01); *G08G 1/167* (2013.01); *G08G 1/20* (2013.01)

(58) Field of Classification Search
  CPC .......... G08G 1/167; G08G 1/123; G08G 1/20; B60K 35/00; B60K 37/06
  See application file for complete search history.

(56) References Cited

U.S. PATENT DOCUMENTS

| | | | |
|---|---|---|---|
| 2015/0127212 A1* | 5/2015 | Chacon | B60R 21/013 701/32.4 |
| 2015/0204687 A1* | 7/2015 | Yoon | G01C 21/3658 701/436 |
| 2015/0353082 A1* | 12/2015 | Lee | B60W 30/09 701/41 |

* cited by examiner

| TIME | IMAGE No. | DRIVING DISTANCE | RIGHT EDGE DISTANCE (cm) | LEFT EDGE DISTANCE (cm) |
|---|---|---|---|---|
| T1 | P1 | S1 | 25 | 25 |
| T2 | P2 | S2 | 26 | N/A |
| T3 | P3 | S3 | 50 | On Line |
| ⋮ | | | | |
| TN | PN | SN | 23 | 27 |

ID, INFORMATION PRESENTATION DEVICE, ON-VEHICLE DEVICE, INFORMATION PRESENTATION SYSTEM, AND INFORMATION PRESENTATION METHOD

CROSS-REFERENCE TO RELATED APPLICATION

This application is based upon and claims the benefit of priority of the prior Japanese Patent Application No. 2015-131985, filed on Jun. 30, 2015, the entire contents of which are incorporated herein by reference.

FIELD

The embodiment discussed herein is directed to an information presentation device, an on-vehicle device, an information presentation system, and an information presentation method.

BACKGROUND

A device has conventionally been known that detects a compartment line for lanes based on an image captured by an imaging device mounted on a vehicle and raises an alert in a case where an own vehicle may depart from a lane (see, for example, Japanese Patent No. 5389864).

However, in a conventional device, it cannot be known how an own vehicle drives on a driving lane in a case where it does not depart from the lane. Thus, in a conventional device, there is a problem in presentation of driving information of a vehicle.

SUMMARY

An information presentation device according to an embodiment includes an acquisition unit, a generation unit, and an output unit. The acquisition unit acquires information of a driving history with respect to a driving position in a driving lane of a vehicle, where the information is generated by an on-vehicle device based on an image captured by an imaging device that is mounted on the vehicle. The generation unit generates information of a graph that indicates a transition of a positional change of the vehicle in the driving lane, based on the information of a driving history acquired by the acquisition unit. The output unit outputs the information of a graph generated by the generation unit to a display device. The acquisition unit acquires the information of a driving history that includes distances of a right edge and a left edge of the driving lane with respect to the vehicle. The generation unit generates the information of a graph based on a difference between the distances of a right edge and a left edge of the driving lane with respect to the vehicle that is included in the information of a driving history acquired by the acquisition unit.

BRIEF DESCRIPTION OF DRAWINGS

More complete recognition of the present invention and advantage involved therewith could readily be understood by reading the following detailed description of the invention in conjunction with the accompanying drawings.

DESCRIPTION OF EMBODIMENTS

Hereinafter, an embodiment of an information presentation device, an on-vehicle device, an information presentation system, and an information presentation method as disclosed in the present application will be described in detail, with reference to the accompanying drawings. This invention is not limited to an embodiment illustrated below.

1. Information Presentation Method

Figure 1:
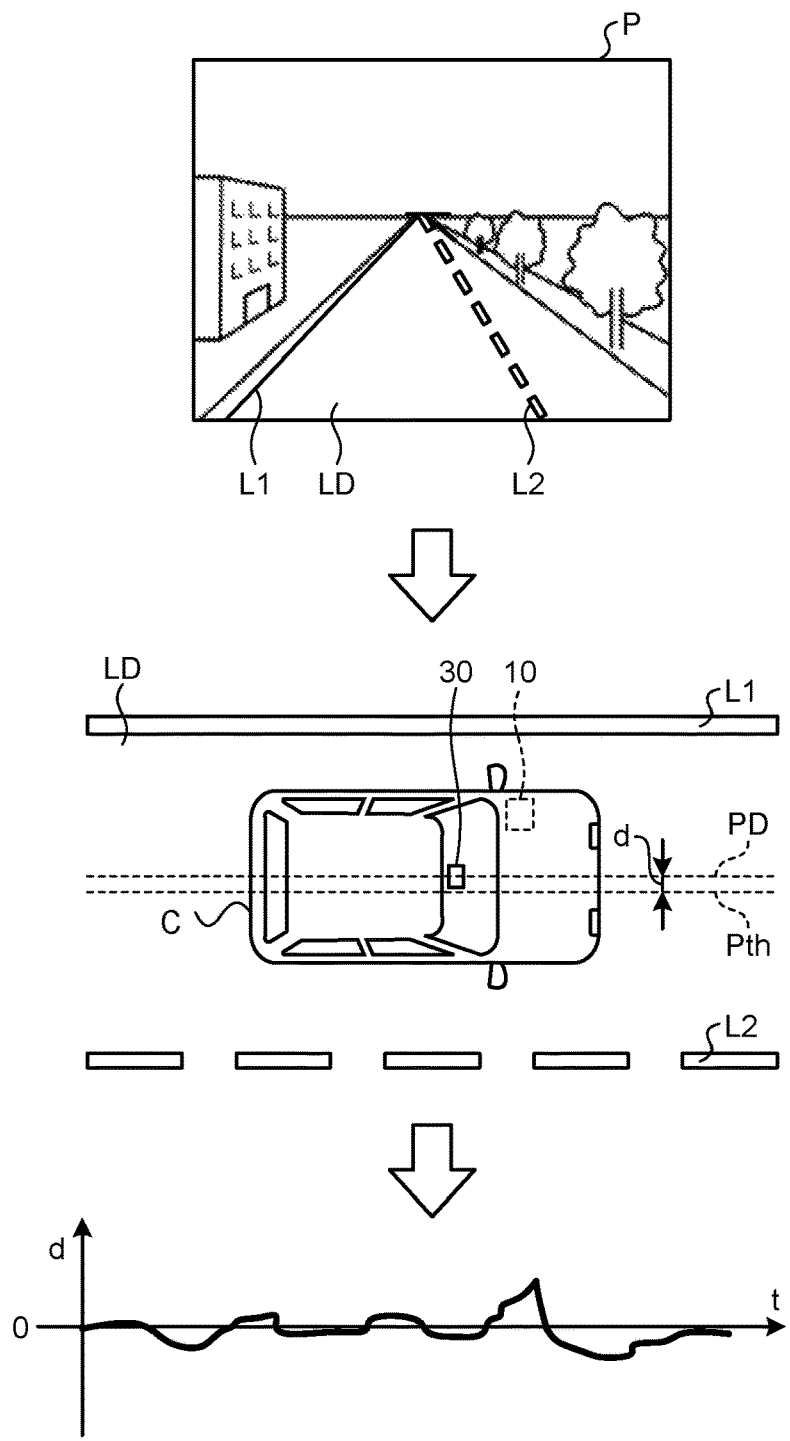
FIG. 1 is an illustration diagram illustrating an information presentation method according to an embodiment.

FIG. 1 is an illustration diagram illustrating an information presentation method according to an embodiment. An information presentation method according to the present embodiment is executed by, for example, an information presentation system 1 that includes an on-vehicle device 10 that is mounted on a vehicle C and an information presentation device 20 (not illustrated)

In an information presentation method according to the present embodiment, the on-vehicle device 10 generates information of a driving history with respect to a driving position PD in a lane with the vehicle C driving therein (that will be described as a driving lane LD of a vehicle C below) based on a captured image P of an imaging device 30 that is mounted on the vehicle C.

The on-vehicle device 10 detects each of a left edge L1 and a right edge L2 of the driving lane LD of the vehicle C based on the captured image P that is sequentially input from the imaging device 30. The on-vehicle device 10 detects, for example, a compartment line that compartments the driving lane LD from an adjacent lane or the like, a median strip, a curb on a sidewalk, or the like, as the left edge L1 and the right edge L2 of the driving lane LD. Herein, the on-vehicle device 10 detects a compartment line that is a straight line, as the left edge L1 of the driving lane LD, and detects a compartment line that is a broken line, as the right edge L2. The on-vehicle device 10 sequentially generates, and stores as information of a driving history, information of the driving position PD of the vehicle C in the driving lane LD based on the detected compartment line.

The information presentation device 20 acquires information of a driving history generated by the on-vehicle device 10. The information presentation device 20 calculates a difference d between a driving reference line Pth that is defined in the driving lane LD and the driving position PD of the vehicle C based on information of the left edge L1 and the right edge L2 of the driving lane LD that is included in the acquired information of a driving history, so that the driving position PD of the vehicle C is calculated. Herein, the driving reference line Pth is a line that is a reference for the vehicle C that safely drives in the driving lane LD, such as, for example, a line that passes through a center of the driving lane LD. The driving reference line Pth is defined, for example, substantially at a center in the driving lane LD. The driving position PD of the vehicle C is a line that passes through a center of the vehicle C.

The information presentation device 20 calculates a difference d between the driving reference line Pth and the driving position PD of the vehicle C for each predetermined period or predetermined distance in a predetermined period of time, for example, between a start and an end of driving of the vehicle C.

The information presentation device 20 generates information of a graph that indicates a transition of a positional change of the vehicle C in the driving lane LD based on the difference d between the driving reference line Pth and the driving position PD of the vehicle C. The information presentation device 20 generates information of a graph that indicates a relationship between a driving time or a driving distance of the vehicle C and a distance (difference) d from the driving reference line Pth to the driving position PD of the vehicle C.

The information presentation device 20 generates, and outputs to a display device (not illustrated) such as a display or a printer, a graph with a horizontal axis that is provided for, for example, a driving time t and a vertical axis that is provided for the distance d from the driving reference line Pth to the driving position PD of the vehicle C.

As described above, the on-vehicle device 10 generates information of a driving history with respect to the driving position PD of the vehicle C in the driving lane LD based on the captured image P of the imaging device 30, and the information presentation device 20 outputs, to a display device, information of a graph that indicates a transition of a positional change of the vehicle C in the driving lane LD, based on the information of a driving history generated by the on-vehicle device 10. Thereby, information of driving of the vehicle C can be presented adequately.

The information presentation device 20 also generates information of a graph that indicates a relationship between a driving time or a driving distance of the vehicle C and the distance d from the driving reference line Pth to the driving position PD of the vehicle C. Thereby, the driving position PD of the vehicle C with respect to the driving reference line Pth such as a center of the driving lane LD, can readily be recognized, for example, independently of a kind of the vehicle C or the like, so that whether or not a driver for the vehicle C executes safe driving can readily be recognized. Hereinafter, the information presentation system 1 that includes the on-vehicle device 10 and the information presentation device 20 will further be described.

2. Summary of Information Presentation System 1

Figure 2:
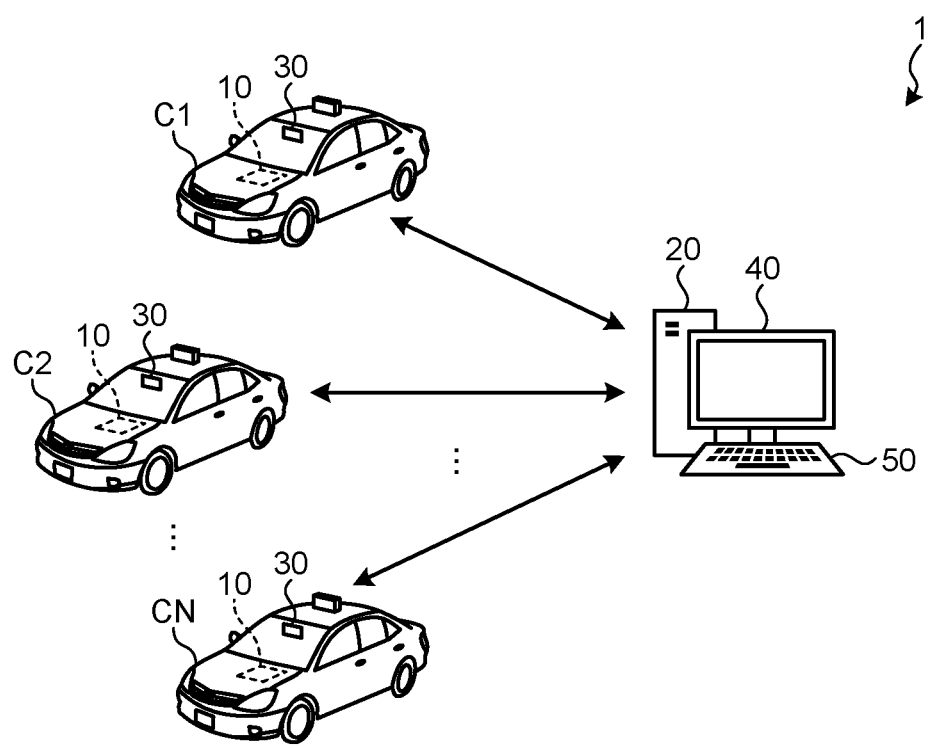
FIG. 2 is a diagram illustrating a summary of an information presentation system according to an embodiment.

FIG. 2 is a diagram illustrating a summary of an information presentation system 1 according to an embodiment of the present invention. The information presentation system 1 is suitable for a system that manages operating of a commercial vehicle such as, for example, a taxi, a bus, or a truck. The information presentation system 1 includes an on-vehicle device 10, an information presentation device 20, an imaging device 30, a display device 40, and an input device 50.

Each of the on-vehicle device 10 and the imaging device 30 is mounted on a plurality of vehicles Cn (n=1 to N, and the plurality of vehicles Cn will also be collectively described as vehicles C below). For the on-vehicle device 10, for example, a drive recorder, a digital tachograph, a lane departure alert device, or the like is provided. The on-vehicle device 10 generates information of a driving history during driving of a vehicle Cn based on a captured image P of the imaging device 30. Although each of the on-vehicle device 10 and the imaging device 30 is separately provided on the vehicle Cn in FIG. 2, the on-vehicle device 10 and the imaging device 30 may be provided as one device on the vehicle Cn.

The information presentation device 20, the display device 40, and the input device 50 are provided, for example, in a business office for the vehicle Cn or the like. The information presentation device 20 acquires information of a driving history from the on-vehicle device 10 of a vehicle C that, for example, closes for business and arrives back to a business office. The information presentation device 20 acquired information of a driving history generated by the on-vehicle device 10 through, for example, a portable recording medium (for example, an SD card or a USE memory).

The information presentation device 20 generates information of a graph that indicates a transition of a positional change of the vehicle C in a driving lane LD based on the information of a driving history acquired from the on-vehicle device 10, and outputs the generated information of a graph to the display device 40. The information presentation device 20 executes acquisition of information of a driving history, and input and output of information of a graph, for example, in accordance with an instruction that is input from the input device 50.

3. Detail of Information Presentation System 1

Figure 3:
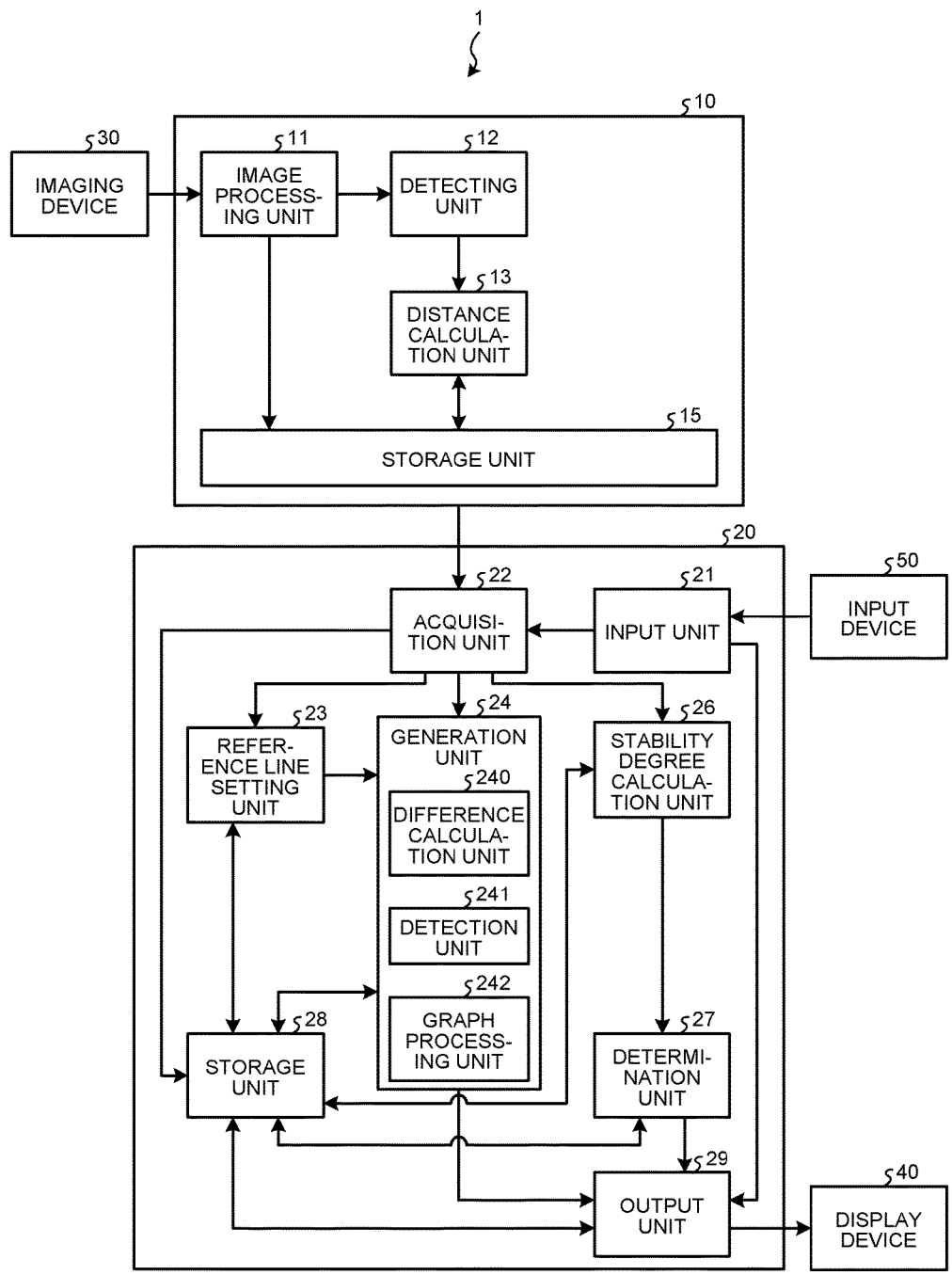
FIG. 3 is a configuration diagram of an information presentation system according to an embodiment.

A detail of the information presentation system 1 according to the present embodiment will be described by using FIG. 3. FIG. 3 is a configuration diagram of the information presentation system 1.

3. 1. Imaging Device 30

The imaging device 30 is arranged, for example, at a front of a vehicle C, and executes imaging in an imaging direction that is a front direction of the vehicle C. The imaging device 30 includes an imaging element such as a Charge Coupled Device (CCD) or a Complementary Metal Oxide Semiconductor (CMOS), and outputs, to the on-vehicle device 10, a front image of the vehicle C that is captured by such an imaging element (that will be described as a captured image, below). For example, in a case where the on-vehicle device 10 is a drive recorder, the imaging device 30 corresponds to a camera mounted on the drive recorder.

The imaging device 30 that is arranged in front of the vehicle C has been described as an example herein, and is not limited thereto. It is sufficient for the on-vehicle device 10 to detect a left edge L1 and a right edge L2 of a driving lane LD, and the imaging device 30 may be provided, for example, at a back of the vehicle C. The number of the imaging devices 30 is not limited to one, but, for example, may be provided on a left side and a right side of the vehicle C, respectively, or may be provided on a front side, a back side, a right side, and a left side of the vehicle C, respectively.

3. 2. On-Vehicle Device 10

The on-vehicle device 10 includes an image processing unit 11, a detecting unit 12, a distance calculation unit 13, and a storage unit 15.

3. 2. 1. Image Processing Unit 11

The image processing unit 11 applies image processing to a captured image P that is input from the imaging device 30 for each predetermined period. The image processing unit 11 stores in the storage unit 15, and outputs to the detecting unit 12, the captured image P with image processing having been applied thereto.

3. 2. 2. Detecting Unit 12

The detecting unit 12 detects the left edge L1 and the right edge L2 of the driving lane LD for each predetermined period or predetermined distance, based on the captured image P that is input from the image processing unit 11. The detecting unit 12 detects, for example, compartment lines that are marked on the driving lane LD, as the left edge L1 and the right edge L2 of the driving lane LD. Such a compartment line is, for example, a solid line or a broken line with a white color, a yellow color, or the like. Specifically, a center line (roadway center line, so-called center line), a boundary line (roadway boundary line or vehicular lane boundary line), or an outer line (roadway outer line or vehicular lane outermost line) that is applied on a road is provided.

For example, the detecting unit 12 detects edges that are included in a captured image Pn at a time Tn, and detects left and right compartment lines of the driving lane LD among the detected edges so that the left edge L1 and the right edge L2 of the driving lane LD is detected.

For example, in a case where no compartment line is marked on a road such as a case of straight running at an intersection or a case where a compartment line is thinned, it may be impossible to detect a compartment line from the captured image Pn at the time Tn. In this case, the detecting unit 12 may detect imaginary lines on the captured image Pn as the left and right edges L1 and L2 of the driving lane LD, for example, based on a captured image Pn−1 at a time Tn−1 before the time Tn.

The detecting unit 12 may detect, for example, obstacles provided along the driving lane LD, such as curbs or walls on sidewalks, as the left edge L1 and the right edge L2 of the driving lane LD. In this case, the detecting unit 12 detects edges, for example, from the captured image Pn at the time Tn, similarly to a case where a compartment line is detected, and detects obstacles provided along the driving lane LD, such as curbs or walls of sidewalks, among the detected edges.

The detecting unit 12 outputs the detected left and right edges L1 and L2 of the driving lane LD to the distance calculation unit 13, and associates and stores in the storage unit 15, the captured image Pn used for detecting with the time Tn when the left and right edges L1 and L2 are detected.

The detecting unit 12 outputs detected one of the left and right edges L1 and L2 of the driving lane LD to the distance calculation unit 13, for example, in a case of turning at an intersection or a case where only one of the left and right edges L1 and L2 of the driving lane LD can be detected due to a parked vehicle or the like.

For example, in a case where the detecting unit 12 detects the left and right edges L1 and L2 of the driving lane LD for each predetermined distance, the detecting unit 12 calculates a driving distance of the vehicle C depending on a velocity of the vehicle C for each predetermined period and detects the left and right edges L1 and L2 of the driving lane LD for each predetermined distance depending on the calculated driving distance.

Specifically, for example, a velocity Vn of the vehicle C at the time Tn is multiplied by a predetermined period T=Tn−(Tn−1) so that a moving distance Sn of the vehicle C between the time Tn−1 and the time Tn is calculated. The detecting unit 12 detects the left and right edges L1 and L2 of the driving lane LD for each predetermined period based on the calculated distance Sn.

Alternatively, the moving distance Sn of the vehicle C may be calculated based on an amount of movement of a characteristic point between the captured image Pn−1 at the time Tn−1 and the captured image Pn at the time Tn. The detecting unit 12 associates, and stores in the storage unit 15, the moving distance Sn with the time Tn.

3. 2. 3. Distance Calculation Unit 13

Figures 4, 5:
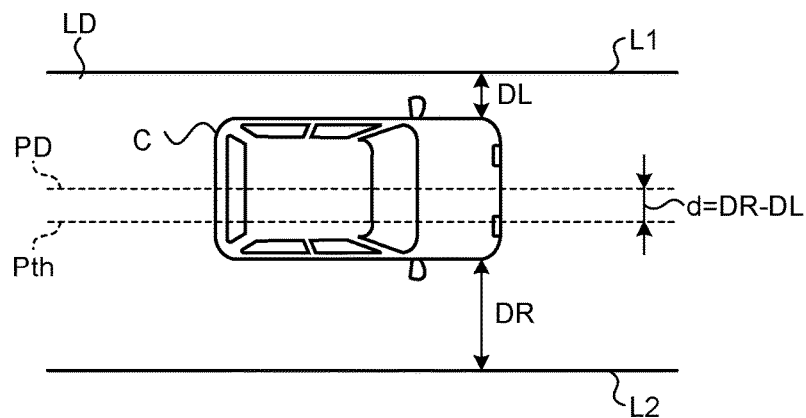
FIG. 4 is a diagram illustrating a left edge distance and a right edge distance that are calculated by a distance calculation unit according to an embodiment.
FIG. 5 is a diagram illustrating a driving history table that is stored in a storage unit according to an embodiment.

The distance calculation unit 13 calculates a distance DL (left edge distance DL) between the left edge L1 of the driving lane LD at the time Tn and a left edge of the vehicle C and a distance DR (right edge distance DR) between the right edge L2 of the driving lane LD and a right edge of the vehicle C based on positions of the left edge L1 and the right edge L2 of the driving lane LD that are detected by the detecting unit 12, on the captured image Pn (see FIG. 4). FIG. 4 is a diagram illustrating the left edge distance DL and the right edge distance DR (that will also be collectively described as left and right edge distances DL and DR, below) that are calculated by the distance calculation unit 13.

The distance calculation unit 13 calculates the left and right edge distances DL and DR depending on positions of the left and right edges L1 and L2 of the driving lane LD on the captured image Pn based on information of a width of the vehicle C and a position of the imaging device 30 mounted on the vehicle C that are preliminarily stored in the storage unit 15. The distance calculation unit 13 stores the calculated left and right edge distances DL and DR in the storage unit 15.

Herein, for example, in a case where at least one of the left and right edges L1 and L2 of the driving lane LD cannot be detected as described above, the distance calculation unit 13 provides that distances between the left and right edges L1 and L2 and the vehicle C is undetectable, and stores such a state in the storage unit 15. Alternatively, the distance calculation unit 13 may calculate only a distance between one of the left edge L1 and the right edge L2 that is detected by the detecting unit 12 and the vehicle C and store a calculation result in the storage unit 15.

For example, in a case where the vehicle C cuts across an edge line of one of the left and right edges L1 and L2 of the driving lane LD, such as a case where the vehicle C is executing a lane change, the distance calculation unit 13 causes the storage unit 15 to store a state where the vehicle C cuts across one of the left and right edges L1 and L2. Alternatively, distances between the left and right edges L1 and L2 and the vehicle C are undetectable by the detecting unit 12, and such a state is stored in the storage unit 15.

3. 2. 4. Storage Unit 15

The storage unit 15 stores, for example, the captured image P of the imaging device 30. The storage unit 15 also associates and stores the driving distance Sn and the left and right edge distances DL and DR that are calculated by the detecting unit 12 and the distance calculation unit 13, with the time Tn and the captured image Pn.

FIG. 5 is a diagram illustrating a driving history table stored in the storage unit 15. "IMAGE No." in a driving history table illustrated in FIG. 5 is a number associated with the captured image Pn.

As illustrated in FIG. 5, the storage unit 15 associates and stores the time Tn, the captured image Pn, the driving distance Sn, and the left and right edge distances DL and DR. For example, in a case where the detecting unit 12 cannot detect the left edge of the driving lane LD and the distance calculation unit 13 cannot calculate the left edge distance DL, the storage unit 15 stores, for example, "N/A" (not available) for the left edge distance DL (see a time T2 in FIG. 5). The storage unit 15 stores, for example, information of "On Line" for the left edge distance DL, and thereby, stores a state where the vehicle C drives so as to cut across the left edge L1 of the driving lane LD (see a time T3 in FIG. 5).

Herein, for example, a case where at least one of the left and right edges L1 and L2 of the driving lane LD cannot be detected or the vehicle C drives so as to cut across the left edge L1 of the driving lane LD due to a lane change or the like, "N/A" or "On Line" is stored for the left and right edge distances DL and DR that are not limited thereto. For example, a corresponding column of a driving history table may be a blank column.

Although a case where the storage unit 15 stores the time Tn, the captured image Pn, the driving distance Sn, and the left and right edge distances DL and DR as information of a driving history that is stored in a driving history table has been described herein, the information of a driving history is not limited thereto. For example, a velocity of the vehicle C, information of a position of the vehicle C based on GPS information, or the like may be included therein.

The storage unit 15 is, for example, semiconductor memory element such as a Random Access Memory (RAM) or a flash memory, or a storage device such as a hard disk or an optical disc. Alternatively, the storage unit 15 may be, for example, a portable storage device such as an SD card or a USE memory.

3. 3. Information Presentation Device 20

The information presentation device 20 illustrated in FIG. 3 includes an input unit 21, an acquisition unit 22, a reference line setting unit 23, a generation unit 24, a stability degree calculation unit 26, a determination unit 27, a storage unit 28, and an output unit 29.

3. 3. 1. Input Unit 21

The input unit 21 receives an instruction signal that is input from the input device 50 depending on a user operation. The input unit 21 receives an instruction for displaying information of a graph on the display device 40, from, for example, the input device 50, and then, notifies the acquisition unit 22 to acquire information of a driving history. The input unit 21 also notifies the output unit 29 to output information of a graph.

3. 3. 2. Acquisition Unit 22

The acquisition unit 22 acquires information of a driving history that is generated by the on-vehicle device 10 depending on notification from the input unit 21. For example, the acquisition unit 22 acquires information of a driving history generated by the on-vehicle device 10, from a portable storage medium through a connector such as an SD card slot or an USB port. The acquisition unit 22 also acquires the captured image Pn.

In a case where the storage unit 15 of the on-vehicle device 10 is a portable storage medium, the acquisition unit 22 acquires information of a driving history directly from the storage unit 15. On the other hand, in a case where the storage unit 15 of the on-vehicle device 10 is not a portable storage medium, for example, information of a driving history is copied from the storage unit 15 to a portable storage medium and the acquisition unit 22 acquires the information of a driving history from such a portable storage medium.

Herein, the acquisition unit 22 acquires information of a driving history through a portable storage medium and is not limited thereto. For example, in a case where each of the on-vehicle device 10 and the information presentation device 20 includes, for example, a communication device such as a wireless device, information of a driving history may be acquired through such a communication device. Alternatively, each of the on-vehicle device 10 and the information presentation device 20 may be connected to a network such as the Internet so that information of a driving history is acquired from such a network.

The acquisition unit 22 outputs the acquired information of a driving history to the reference line setting unit 23, the generation unit 24, and the stability degree calculation unit 26. The acquisition unit 22 causes the storage unit 28 to store the acquired information of a driving history and the captured image Pn.

3. 3. 3. Reference line Setting Unit 23

The reference line setting unit 23 sets a driving reference line Pth at a position in the driving lane LD depending on at least one of information with respect to the vehicle C and information with respect to the driving lane LD. For information with respect to the vehicle C, for example, a width, a kind, or the like of the vehicle C is provided. For information with respect to the driving lane LD, for example, a width of the driving lane LD or a kind of the driving lane LD such as a one-way road or a single lane road on each side is provided. Information with respect to the vehicle C and information with respect to the driving lane LD are preliminarily stored in, for example, the storage unit 28.

Figure 6:
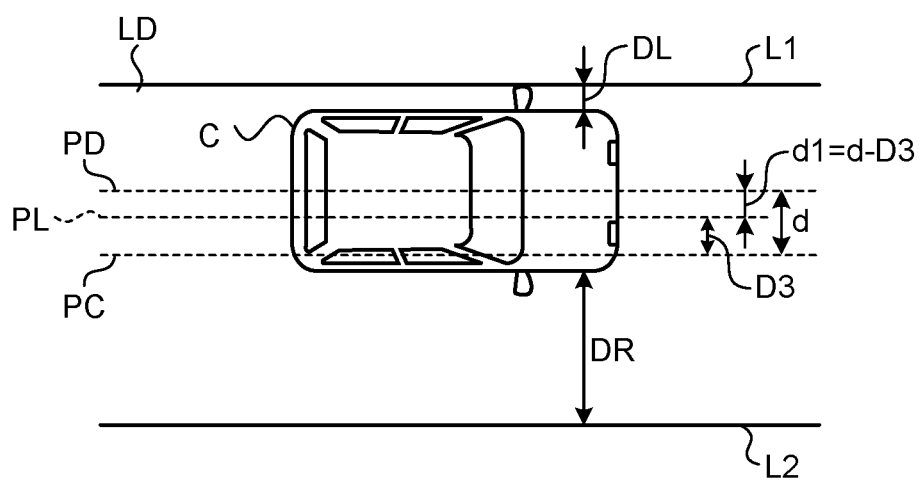
FIG. 6 is a diagram illustrating a driving reference line that is set by a reference line setting unit according to an embodiment.

FIG. 6 is a diagram illustrating the driving reference line Pth that is set by the reference line setting unit 23. The reference line setting unit 23 sets the driving reference line Pth at a center line PC of the driving lane LD, for example, in a case where a width of the vehicle C is greater than a predetermined value, such as a standard size vehicle or a large size vehicle. For example, in a case where a width of the vehicle C is less than or equal to a predetermined value, such as a mini-vehicle or a small size vehicle, the driving reference line Pth is set at a line PL that is shifted by a distance D3 from the center line PC of the driving lane LD toward the left edge L1.

For example, in a case where a width of the driving lane LD is greater than a predetermined value, the reference line setting unit 23 may set the driving reference line Pth at the line PL that is shifted by the distance D3 from the center line PC of the driving lane CD toward the left edge L1. For example, in a case where a width of the driving lane LD is less than or equal to a predetermined value, the reference line setting unit 23 may set the driving reference line Pth at the center line. PC of the driving lane LD.

Alternatively, in a case where a difference between a width of the driving lane LD and a width of the vehicle C is greater than a predetermined value, the driving reference line Pth may be set at the line PL that is shifted by the distance D3 from the center line PC of the driving lane LD toward the left edge L1.

In general, it is considered that driving of the vehicle C on a more left side of the driving lane LD is safer than driving thereof at a center of the driving lane LD. Accordingly, the reference line setting unit 23 sets the driving reference line Pth at a more left side of the driving lane LD depending on at least one of information with respect to the vehicle C and information with respect to the driving lane LD.

For example, in a case where a left edge of the driving lane LD is a road shoulder, the driving reference line Pth may be set depending on a kind of the driving lane LD, such as the driving reference line Pth being set at the line PL that is shifted by the distance D3 from the center line PC of the driving lane LD toward the left edge L1.

An amount of a shift of the driving reference line Pth that is shifted by the reference line setting unit 23 is not limited to the distance D3. For example, an amount of shift of the driving reference line Pth to be shifted may be determined depending on a width of the vehicle C among a plurality of amounts of shift thereof.

For example, the reference line setting unit 23 may set one driving reference line Pth for information of a driving history acquired by the acquisition unit 22 or may set a plurality of driving reference lines Pth for each time Tn or for each predetermined interval. The reference line setting unit 23 outputs the set driving reference line Pth to the generation unit 24.

3. 3. 4. Generation Unit 24

The generation unit 24 illustrated in FIG. 3 generates information of a graph that indicates a transition of a positional change of the vehicle C in the driving lane LD based on information of a driving history acquired by the acquisition unit 22. The generation unit 24 includes a difference calculation unit 240, a detection unit 241, and a graph processing unit 242.

3. 3. 4. 1. Difference Calculation Unit 240

The difference calculation unit 240 calculates a difference d between the right edge distance DR and the left edge distance DL that is included in the acquired information of a driving history (see FIG. 4). For example, the difference calculation unit 240 subtracts the left edge distance DL from the right edge distance DR to calculate the difference d.

In this case, the difference d is a positive value (d>0) if the vehicle C drives on a more left side of the driving lane LD, and the difference d is a negative value (d<0) if the vehicle C drives on a more right side of the driving lane LD. The difference d=0, if the vehicle C drives at a center of the driving lane LD. The difference calculation unit 240 outputs the calculated difference d to the graph processing unit 242.

On the other hand, in a case where the driving reference line Pth is set to be shifted by the distance D3 from the center line PC of the driving lane LD to a side of a left edge thereof (see FIG. 6), the difference calculation unit 240 adjusts a value of the difference d between the right edge distance DR and the left edge distance DL depending on such a shift.

Specifically, the difference calculation unit 240 subtracts the distance D3 dependent on the driving reference line Pth from the difference d between the right edge distance DR and the left edge distance DL to calculate, and output to the graph processing unit 242, a post-adjustment difference d1 (d1=d−D3, see FIG. 6).

3. 3. 4. 2. Detection Unit 241

The detection unit 241 detects an interval where a driving position PD of the vehicle C in the driving lane LD cannot be detected, based on information of a driving history acquired by the acquisition unit 22. The detection unit 241 detects an interval where at least one of the left and right edges L1 and L2 of the driving lane LD cannot be detected, as an interval where the driving position PD cannot be detected, for example, in a case where the vehicle C executes a right or left turn at an intersection, or the like. For example, in a case where the vehicle C executes a lane change or the like, an interval where the vehicle C cuts across an edge line of at least one of the left and right edges L1 and L2 of the driving lane LD is detected as an interval where the driving position PD cannot be detected.

Specifically, the detection unit 241 detects, for example, a time described as "N/A" or a time when the left or right edge distance DL or DR is "On Line", in the driving history table illustrated in FIG. 5 (the time T2 and the time T3 in FIG. 5) as an interval where the driving position PD cannot be detected.

Alternatively, for example, a time that is provided by going back by a predetermined period of time from a time described as "N/A" or a time when the left or right edge distance DL or DR is "On Line", in the driving history table illustrated in FIG. 5, may be a start of an interval and a time when a predetermined period of time has passed since such a time may be an end of the interval. Thus, the detection unit 241 may detect a predetermined interval that includes an interval where at least one of the left and right edges L1 and L2 of the driving lane LD cannot be detected or an interval where the vehicle C cuts across an edge line of at least one of the left and right edges L1 and L2 of the driving lane LD, as an interval where the driving position LD cannot be detected.

For example, in a case where a left turn or a right turn is executed at an intersection or a case where a lane change is executed (that will also be described as a case where a predetermined driving operation is executed, below), it is considered that a driver gradually changes the driving position PD of the vehicle C before a place where a predetermined driving operation is executed. It is considered that a driver gradually changes the driving position PD of the vehicle C to a center of the driving lane LD after a predetermined driving operation is executed.

Hence, the detection unit 241 detects, for example, a predetermined interval that includes an interval where a predetermined driving operation is executed, as an interval where the driving position PD cannot be detected, so that a change of the driving position PD that is executed for the predetermined driving operation can be distinguished from another change of the driving position PD.

The detection unit 241 may detect an interval where a velocity of the vehicle C is less than or equal to a predetermined value, based on information of a velocity of the vehicle C. That is, the detection unit 241 may distinguish from driving and detect a time when the vehicle C is stopped.

3. 3. 4. 5. Graph Processing Unit 242

The graph processing unit 242 generates information of a graph that indicates a relationship between a position of the vehicle C in left and right directions with respect to the driving reference line Pth and a driving time or a driving distance of the vehicle C, based on the difference d that is included in information of a driving history acquired by the acquisition unit 22. The graph processing unit 242 also generates information of a graph except a transition of a positional change of the vehicle C in an interval where the driving position PD detected by the detection unit 241 cannot be detected.

Figure 7A:
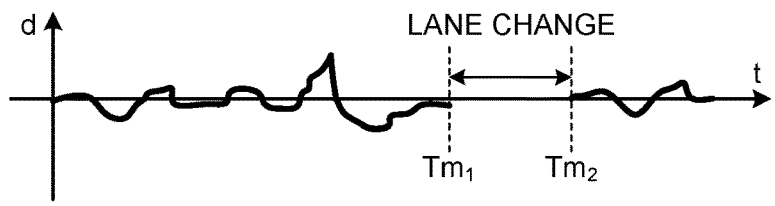
FIG. 7A is a diagram illustrating an example of graph information that is generated by a graph processing unit according to an embodiment.

FIGS. 7A to 7E are diagrams illustrating an example of information of a graph that is generated by the graph processing unit 242. For example, in a case where the driving reference line Pth is set at the center line PC of the driving lane LD (see FIG. 6), the graph processing unit 242 generates information of a graph in such a manner that the difference d between the right edge distance DR and the left edge distance DL is plotted on a graph with a horizontal axis that is provided for a time t and a vertical axis that is provided for a position of the vehicle C in left and right directions with respect to the driving reference line Pth, as illustrated in FIG. 7A.

The graph processing unit 242 does not plot the difference between the right edge distance DR and the left edge distance DL on such a graph, in an interval where the driving position PD detected by the detection unit 241 cannot be detected. Thereby, information of a graph is generated except a transition of a positional change of the vehicle C in an interval where the driving position PD detected by the detection unit 241 cannot be detected.

Herein, the graph processing unit 242 may generate information of a graph with information of an interval where the driving position PD detected by the detection unit 241 cannot be detected being added thereto. For example, in a case where the vehicle C executes a lane change so that the driving position PD cannot be detected, information of a graph may be generated by superimposing character information of a "lane change" on an interval where the difference d is not plotted, as illustrated in FIG. 7A.

For example, the graph processing unit 242 may superimpose information of a "lane change" on an interval where at least one of the left and right edge distanced DL and DR is "On Line" in the driving history table illustrated in FIG. 5 and superimpose information of "left edge undetectable" or "right edge undetectable" on an interval where at least one of the left and right edge distanced DL and DR is "N/A" therein. Alternatively, for example, in a case where it can be determined that a right turn or a left turn is executed at an intersection, based on the captured image Pn, map information of GPS that includes movement history, or the like, information of an "intersection right turn" or an "intersection left turn" may be superimposed thereon.

Thus, information of a graph is generated by superimposing information of an interval of a "lane change" or an "intersection left turn" on an interval where the driving position PD cannot be detected, so that, for example, whether or not the vehicle C executes a lane change frequently can readily be recognized.

Figure 7B:
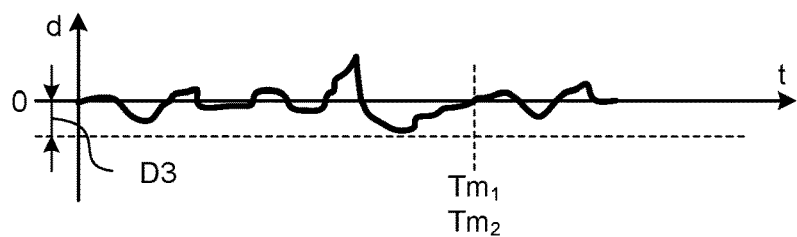
FIG. 7B is a diagram illustrating an example of graph information that is generated by a graph processing unit according to an embodiment.

On the other hand, in a case where the driving reference line Pth is set to be shifted by the distance D3 from the center line PC of the driving lane LD to a side of the left edge L1 (see FIG. 6), the graph processing unit 242 plots a difference d1 provided by shifting the difference d between the right edge distance DR and the left edge distance DL by the distance D3 on a graph with a horizontal axis that is provided for a time t and a vertical axis that is provided for the driving reference line Pth as illustrated in FIG. 7B, so that information of a graph is generated.

Although an interval where the driving position PC cannot be detected is displayed in FIG. 7A, such an interval may be omitted for display, for example, as illustrated in FIG. 7B. For example, in FIG. 7A, an interval from a time Tm1 to a time Tm2 is an interval where the driving position PD cannot be detected. In this case, for example, in FIG. 7B, the time Tm1 and the time Tm2 are superimposed and displayed on each other so that such an interval can be omitted for display.

Figure 7C:
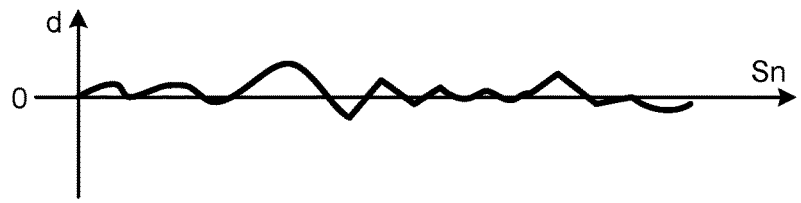
FIG. 7C is a diagram illustrating an example of graph information that is generated by a graph processing unit according to an embodiment.

Information of a graph that is generated by the graph processing unit 242 is not limited to an example illustrated in FIG. 7A or FIG. 7B. For example, as illustrated in FIG. 7C, a horizontal axis may be provided for the driving distance Sn of the vehicle C. In this case, information of a graph is generated based on, for example, the driving distance Sn in the driving history table illustrated in FIG. 5 and the difference d.

Figure 7D:
FIG. 7D is a diagram illustrating an example of graph information that is generated by a graph processing unit according to an embodiment.
Figure 7E:
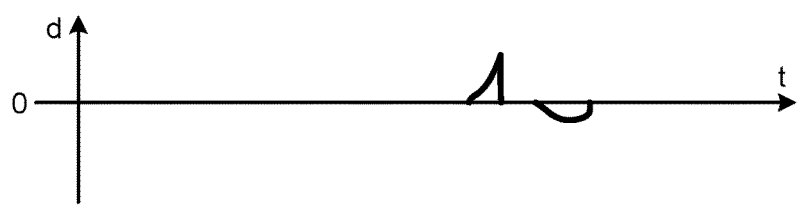
FIG. 7E is a diagram illustrating an example of graph information that is generated by a graph processing unit according to an embodiment.

For example, as illustrated in FIG. 7D, the graph processing unit 242 may generate information of a graph in such a manner that a graph that is included in a predetermined range with a predetermined width D4 centered at the driving reference line Pth is indicated by a dotted line. A display method for a graph that is included in such a predetermined range is not limited to a dotted line but may be, for example, a different display color. Alternatively, as illustrated in FIG. 7E, information of a graph may be generated in such a manner that a graph that is included in a predetermined range with the predetermined width D4 centered at the driving reference line Pth is omitted for display.

Herein, a predetermined range is a range with the predetermined width D4 centered at the driving reference line Pth and is not limited thereto. For example, such a predetermined range may be a range between the center line PC of the driving lane LD and the driving reference line Pth. Alternatively, for example, a plurality of ranges with different widths may be set to change a display method of a graph for each range.

3. 3. 5. Stability Degree Calculation Unit 26

The stability degree calculation unit 26 illustrated in FIG. 3 calculates a degree of stability of driving with respect to the driving lane LD of the vehicle C based on information of a driving history acquired by the acquisition unit 22. Such a degree of stability is an index for indicating whether the vehicle C drives with respect to the driving reference line Pth stably or without wobbling.

For a degree of stability, for example, a standard deviation of the difference d between the driving reference line Pth and the driving position PD of the vehicle C, an area for a graph with respect to a horizontal axis, an average value of derivatives of a graph, or the like is provided. A degree of stability may be the number of a distance from the driving reference line Pth that is greater than a predetermined threshold. The stability degree calculation unit 26 may calculate a plurality of degrees of stability.

The stability degree calculation unit 26 may calculate a degree of stability in a case where the difference d from the driving position PD of the vehicle C is out of a range with the predetermined width D4 centered at the driving reference line Pth. For example, as illustrated in FIG. 7E, a degree of stability is calculated based on a graph with a value of the difference d in such a range being "0".

For example, the stability degree calculation unit 26 calculates a degree of stability for each of a plurality of the vehicles C. The stability degree calculation unit 26 may calculate a degree of stability for each of predetermined driving periods of time (for example, days, weeks, business hours, or the like) of the vehicle C. The stability degree calculation unit 26 associates and stores in the storage unit 28 the calculated degree of stability with the vehicle C and a predetermined driving period of time. The stability degree calculation unit 26 outputs the calculated stability to the determination unit 27.

3. 3. 6. Determination Unit 27

The determination unit 27 determines ranks (ranking) of a plurality of the vehicles C depending on a degree of stability calculated by the stability degree calculation unit 26. For example, in a case where the stability degree calculation unit 26 calculates a standard deviation of the difference d between the driving reference line Pth and the driving position PD of the vehicle C as a degree of stability, the determination unit 27 determines ranks of a plurality of the vehicles C in order of increasing degree of stability.

In a case where the stability degree calculation unit 26 calculates a plurality of degrees of stability, for example, overall ranks of the vehicles C may be determined depending on scores of the vehicles C by executing ranking of the vehicles C with respect to respective degrees of stability and providing such scores with respect to respective ranks of the degrees of stability. Thus, the stability degree calculation unit 26 may determine ranks of the vehicles C depending on a plurality of degrees of stability.

The stability degree calculation unit 26 may determine a rank of the vehicle C for each of predetermined driving periods of time (for example, days, weeks, business hours, or the like). Alternatively, ranks of degrees of stability in different driving periods of time may be determined for an identical vehicle C or an identical driver.

The stability degree calculation unit 26 associates and stores in the storage unit 28 the determined ranks of a plurality of the vehicles C with a predetermined driving period of time and the vehicles C.

3. 3. 7. Storage Unit 28

The storage unit 28 stores information of a driving history acquired by the acquisition unit 22 or the captured image P. The storage unit 28 also stores information needed for a process that is executed by each unit of the information presentation device 20, such as information with respect to the vehicle C or information with respect to the driving lane LD. The storage unit 28 also stores a result of a process that is executed by each unit of the information presentation device 20.

For example, the storage unit 28 is a semiconductor memory element such as a Random Access Memory (RAM) or a flash memory or a storage device such as a hard disk or an optical disc.

3. 3. 8. Output Unit 29

Figure 8:
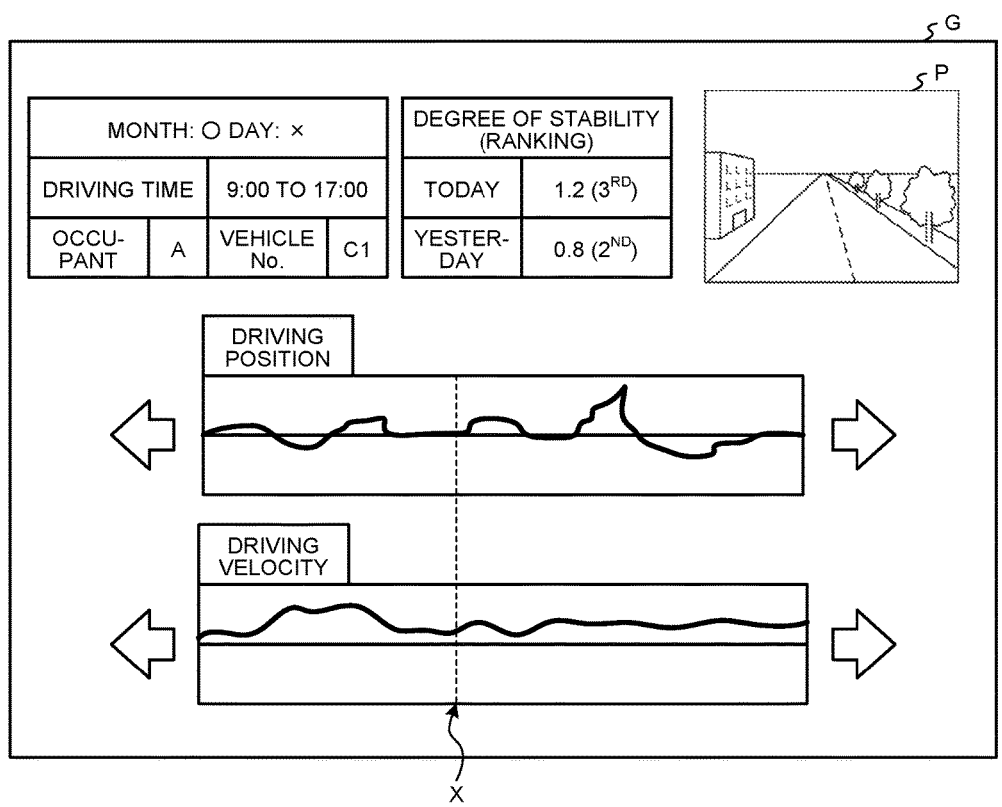
FIG. 8 is a diagram illustrating an example of an image that is generated by an output unit according to an embodiment.

FIG. 8 is a diagram illustrating an example of an image G that is generated by the output unit 29. The output unit 29 displays information of a graph generated by the generation unit 24, a rank of the vehicle C determined by the determination unit 27, or the like, on the display device 40. The output unit 29 generates, and outputs to the display device 40, for example, an image G illustrated in FIG. 8 based on information of a graph, a rank of the vehicle C, or the like. The image G is, for example, a part of a report such as a business diary.

In an example illustrated in FIG. 8, the output unit 29 displays information such as a driving date or a driving time of the vehicle C1 or an occupant that gets in or on the vehicle C1. The output unit 29 also displays a degree of stability that is calculated by the stability degree calculation unit 26 and a rank (ranking) of the vehicle C1 that is determined by the determination unit 27.

The output unit 29 displays, on the image G, a graph that indicates a transition of a positional change of the vehicle C1 in the driving lane LD that is generated by the generation unit 24, as, for example, a "driving position". As illustrated in FIG. 8, a graph that indicates a transition of a driving velocity of the vehicle C1 in addition to a graph generated by the generation unit 24 may also be displayed on the image G as a "driving velocity". For example, in a case where a graph of a "driving position" or a "driving velocity" is too long to be fully displayed on the image G, a part of the graph may be displayed together with an arrow so that, for example, a user clicks the arrow to move the graph.

For example, the output unit 29 may superimpose and display the captured image P on the image G. For example, as a user specifies, by clicking or the like, an arbitrary position on a graph of a "driving position" or a "driving velocity", the captured image P that corresponds to a time at the specified position may be displayed. In an example of FIG. 8, a position that corresponds to a dotted line X is specified and the captured image P that corresponds to a time at such a position is displayed.

The captured image that is superimposed on the image G is not limited to a still image. For example, a moving image with a start provided at an arbitrary position that corresponds to the dotted line X may be regenerated on the image G. Alternatively, in a case where a user specifies a predetermined interval by an operation such as drag, a moving image may be started in such a specified interval.

3. 4. Display Device 40

The display device 40 is a device that can present, for example, the image G generated by the output unit 29, to a user, such as, for example, a liquid crystal display or a printer. For example, in a case where the display device 40 is a liquid crystal display, the display device 40 displays the image G on the liquid crystal display. For example, in a case where the display device 40 is a printer, the display device 40 prints the image G on a paper or the like to display the image G.

3. 5. Input Device 50

The input device 50 is an information input device such as, for example, a keyboard or a mouse, receives an operation of a user for the information presentation device 20, and outputs an instruction signal dependent on such an operation of a user to the input unit 21 of the information presentation device 20. For example, in a case where the input device 50 is a touch panel, the display device 40 that is a liquid crystal display and the input device 50 may be provided as one device.

4. Information Presentation Process

Figure 9:
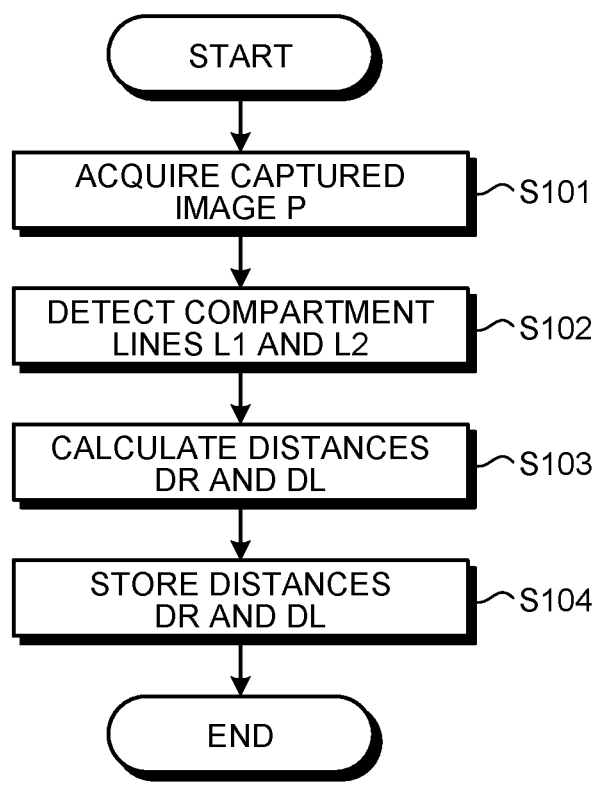
FIG. 9 is a flowchart that illustrates steps of a process that is executed by an on-vehicle device according to an embodiment.
Figure 10:
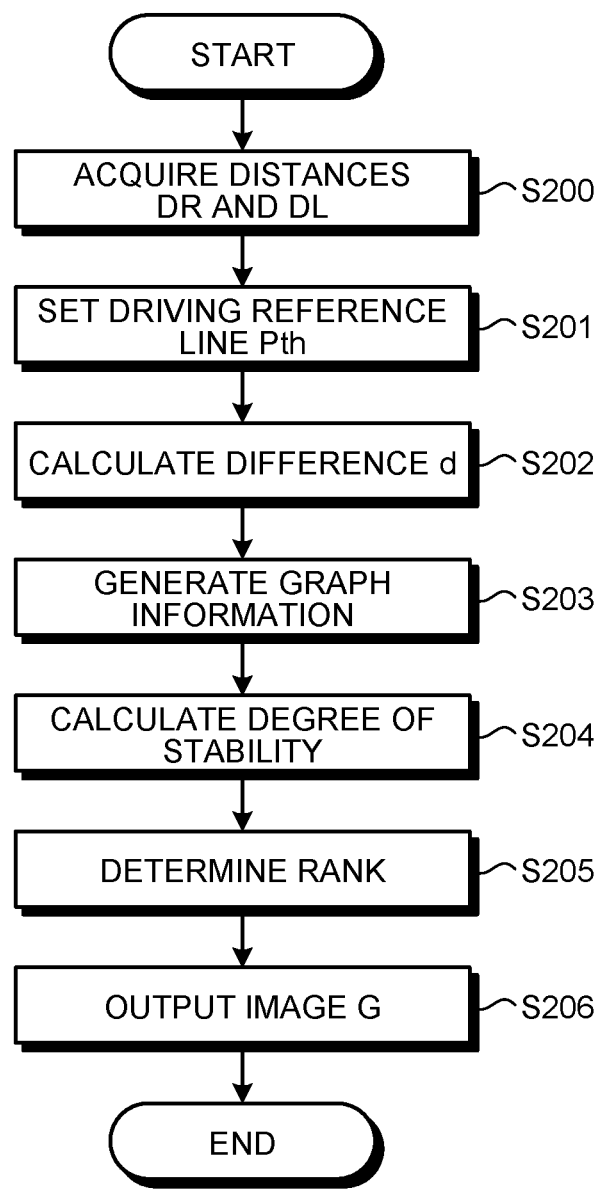
FIG. 10 is a flowchart illustrating steps of a process that is executed by an information presentation device according to an embodiment.

Next, steps of a process that is executed by the on-vehicle device 10 and the information presentation device 20 according to the present embodiment will be described by using FIG. 9 and FIG. 10. FIG. 9 is a flowchart illustrating steps of a process that is executed by the on-vehicle device 10 according to the present embodiment, and FIG. 10 is a flowchart illustrating steps of a process that is executed by the information presentation device 20 according to the present embodiment.

As illustrated in FIG. 9, the on-vehicle device 10 acquires a captured image P from the imaging device 30 (step S101). The on-vehicle device 10 detects left and right edges (that are compartment lines L1 and L2 herein) of a driving lane LD based on the acquired captured image P (step S102).

The on-vehicle device 10 calculates distances DL and DR between the compartment lines L1 and L2 of the driving lane LD and a vehicle C based on the detected compartment lines L1 and L2 (step S103). The on-vehicle device 10 stores the calculated distances DL and DR as information of a driving history (step S104) and ends a process thereof.

The on-vehicle device 10 executes a process illustrated in FIG. 9 for each predetermined period or predetermined driving distance, for example, between a start and a stop of movement of the vehicle C. Alternatively, the on-vehicle device 10 executes a process illustrated in FIG. 9 for each predetermined period or predetermined driving distance, for example, during driving of an engine of the vehicle C.

As illustrated in FIG. 10, the information presentation device 20 acquires information of a driving history that includes the distances DL and DR from the on-vehicle device 10 (step S200). The information presentation device 20 sets a driving reference line Pth at a position in the driving lane LD depending on at least one of information with respect to the vehicle C and information with respect to the driving lane LD (step S201). The on-vehicle device 10 calculates a difference d between the distances DL and DR based on the acquired distances DL and DR and the driving reference line Pth set at step S201 (step S202).

The information presentation device 20 generates information of a graph based on the driving reference line Pth set at step S201 and the difference d calculated at step S202 (step S203). The information presentation device 20 calculates a degree of stability of driving of the vehicle C based on the difference d calculated at step S202 (S204). The information presentation device 20 determines a rank of the vehicle C depending on the calculated degree of stability (step S205). The information presentation device 20 outputs, to the display device 40, an image G that includes at least one of information of a graph generated at step S03 and a rank determined at step S205 (step S206), and ends a process thereof.

An order of executing step S201 to step S203 and step S204 and step S205 may be simultaneous or reverse. Step S201 and step S202 may be executed in the on-vehicle device 10. A process of step S204 and step S205 may be omitted.

5. Hardware Configuration

Figure 11:
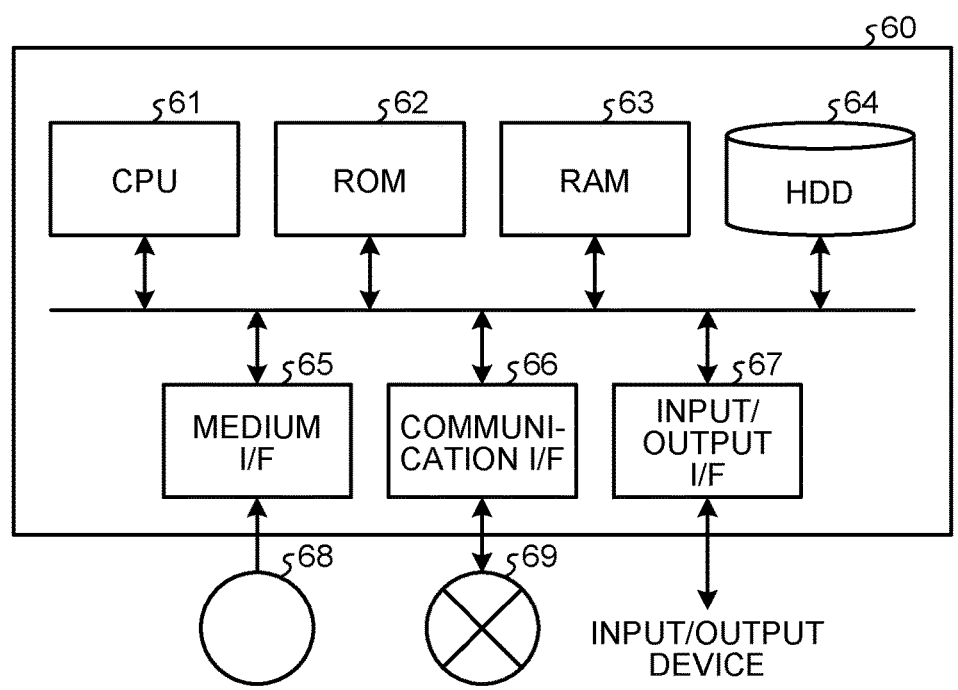
FIG. 11 is a hardware configuration diagram illustrating an example of a computer that realizes a function of an information presentation device according to an embodiment.

The information presentation device 20 according to the present embodiment can be realized by a computer 60 with a configuration illustrated as an example in FIG. 11. FIG. 11 is a hardware configuration diagram illustrating an example of a computer that realizes a function of the information presentation device 20.

The computer 60 includes a Central Processing Unit (CPU) 61, a Read Only Memory (ROM) 62, a Random Access Memory (RAM) 63, and a Hard Disk Drive (HDD) 64. The computer 60 also includes a media interface (I/F) 65, communication interface (I/F) 66, and an input/output interface (I/F) 67.

The computer 60 includes a Solid State Drive (SSD), and such an SSD may execute a part or all of functions of the HDD 64. An SSD may be provided instead of the HDD 64.

The CPU 61 operates based on a program that is stored in at least one of the ROM 62 and the HDD 64, and executes control of each unit. The ROM 62 stores a program that is executed by the CPU 61 at time of boot of the computer 60, a program dependent on hardware of the computer 60, and the like. The HDD 64 stores a program that is executed by the CPU 61, data that are used by such a program, and the like.

The media I/F 65 reads, and provides to the CPU 61 through the RAM 63, a program or data stored in a storage medium 68. The CPU 61 loads such a program from the storage medium 68 onto the RAM 63 through the media I/F 65, and executes the loaded program. Alternatively, the CPU 61 executed a program by using such data. The storage medium 68 is, for example, a magneto-optical recording medium such as a Digital Versatile Disc (DVD), an SD card, a USB memory, or the like.

The communication I/F 66 receives data from another instrument through a network 69 and sends the data to the CPU 61, and transmits data generated by the CPU 61 to another instrument through the network 69. Alternatively, the communication I/F 66 receives a program from another instrument through the network 69 and sends the program to the CPU 61, and the CPU 61 executes the program.

The CPU 61 controls a display device such as a display and an input device such as a keyboard, a mouse, or a button through the input/output I/F 67. The CPU 61 acquires data from an input device through the input/output I/F 67. The CPU 61 outputs the generated data to a display device through the input/output I/F 67.

For example, in a case where the computer 60 functions as the information presentation device 20, the CPU 61 of the computer 60 executes a program loaded on the RAM 63, and thereby, realizes a function of each of the input unit 21, the acquisition unit 22, the reference line setting unit 23, the generation unit 24, the stability degree calculation unit 26, the determination unit 27, and the output unit 29.

For example, the CPU 61 of the computer 60 reads from the storage medium 68 and executes such a program, and for another example, such a program may be acquired from another device through the network 69. The HDD 64 can store information that is stored in the storage unit 28, such as information of a driving history acquired by the acquisition unit 22 or the captured image P.

Although a case where the information presentation device 20 is realized by the computer 60 with a configuration illustrated as an example in FIG. 11 has been described herein, the on-vehicle device 10 can also be similarly realized by the computer 60 with a configuration illustrated as an example in FIG. 11.

For example, in a case where the computer 60 functions as the on-vehicle device 10, the CPU 61 of the computer 60 executes a program loaded on the RAM 63, and thereby, realizes a function of each of the image processing unit 11, the detecting unit 12, and the distance calculation unit 13.

For example, the CPU 61 of the computer 60 reads such a program from the storage medium 68 and executes the program, and for another example, such a program may be acquired from another device through the network 69.

As described above, the information presentation system 1 according to the present embodiment generates information of a driving history with respect to the driving position PD of the vehicle C in the driving lane LD based on the captured image P of the imaging device 30, and outputs, to the display device 40, information of a graph that indicates a transition of a positional change of the vehicle C in the driving lane LD based on the generated information of a driving history. Thereby, information of driving of the vehicle C can be presented adequately.

The information presentation device 20 generates information of a graph that indicates a relationship between a driving time or a driving distance of the vehicle C and the distance d from the driving reference line Pth to the driving position PD of the vehicle C. Thereby, information of a graph can be presented in such a manner that a positional change of the driving position PD of the vehicle C with respect to the driving reference line Pth can readily be recognized, and a person presented with such information of a graph can readily recognize whether or not a driver for the vehicle C executes safe driving.

The generation unit 24 of the information presentation device 20 includes the detection unit 241 that detects an interval where the driving position PD of the vehicle C in the driving lane LD cannot be detected, based on information of a driving history acquired by the acquisition unit 22, and the graph processing unit 242 that generates information of a graph except a transition of a positional change of the vehicle C in an interval detected by the detection unit 241.

Thereby, information of a graph can be generated except a case where the driving position PD is changed for the purpose of, for example, a case where the vehicle C turns right or left at an intersection, a case where a lane change is executed thereby, or the like, and information of a graph in an interval where it is desired to confirm whether or not a user executes safe driving can be generated and presented to a user.

The information presentation device 20 includes the reference line setting unit 23 that sets the driving reference line Pth at a position in the driving lane LD depending on at least one of information with respect to the vehicle C and information with respect to the driving lane LD.

Thereby, the driving reference line Pth can be set at a position where the vehicle can be driven more safely. Therefore, the information presentation device 20 can present whether or not the vehicle C executes safer driving.

The information presentation device 20 calculates a degree of stability for each vehicle C based on information of a graph, and thereby, can present, to a user, an index that can readily determine whether or not a driver executes safe driving. A rank can be determined for each of a plurality of the vehicles C depending on a degree of stability and such a rank is presented to a user, so that information can be presented that can improve motivation of a driver for safe driving.

6. Variations

Figure 12:
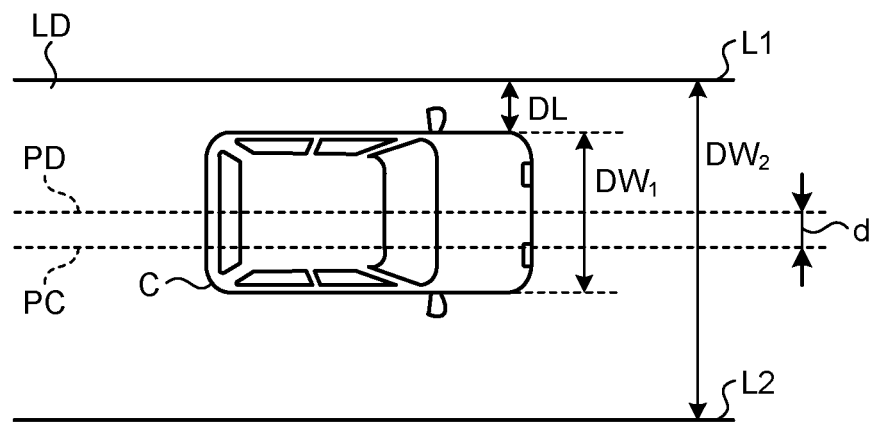
FIG. 12 is a diagram illustrating variation 1 of the present embodiment.
Figure 13:
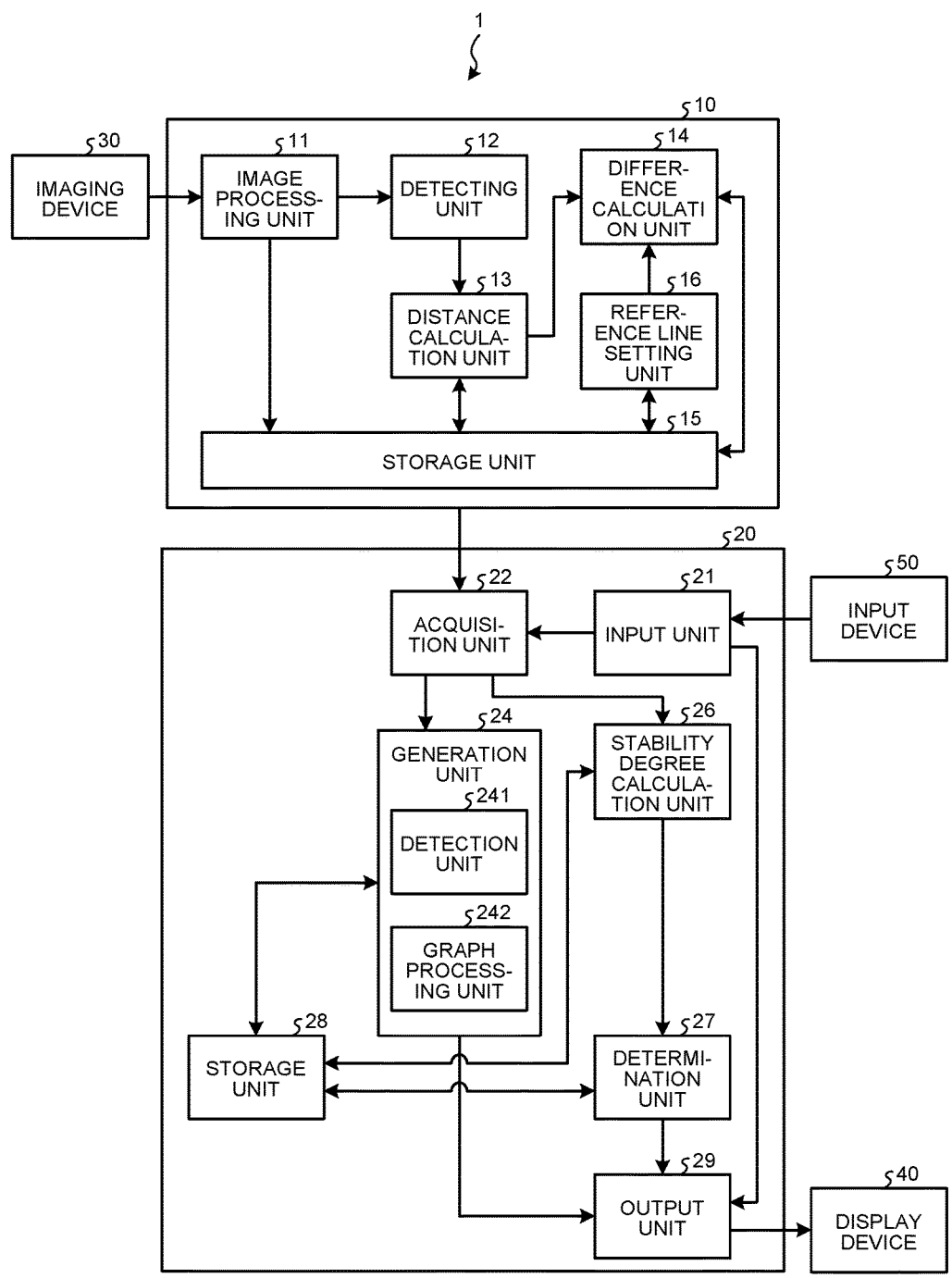
FIG. 13 is a diagram illustrating variation 2 of the present embodiment.
Figure 14:
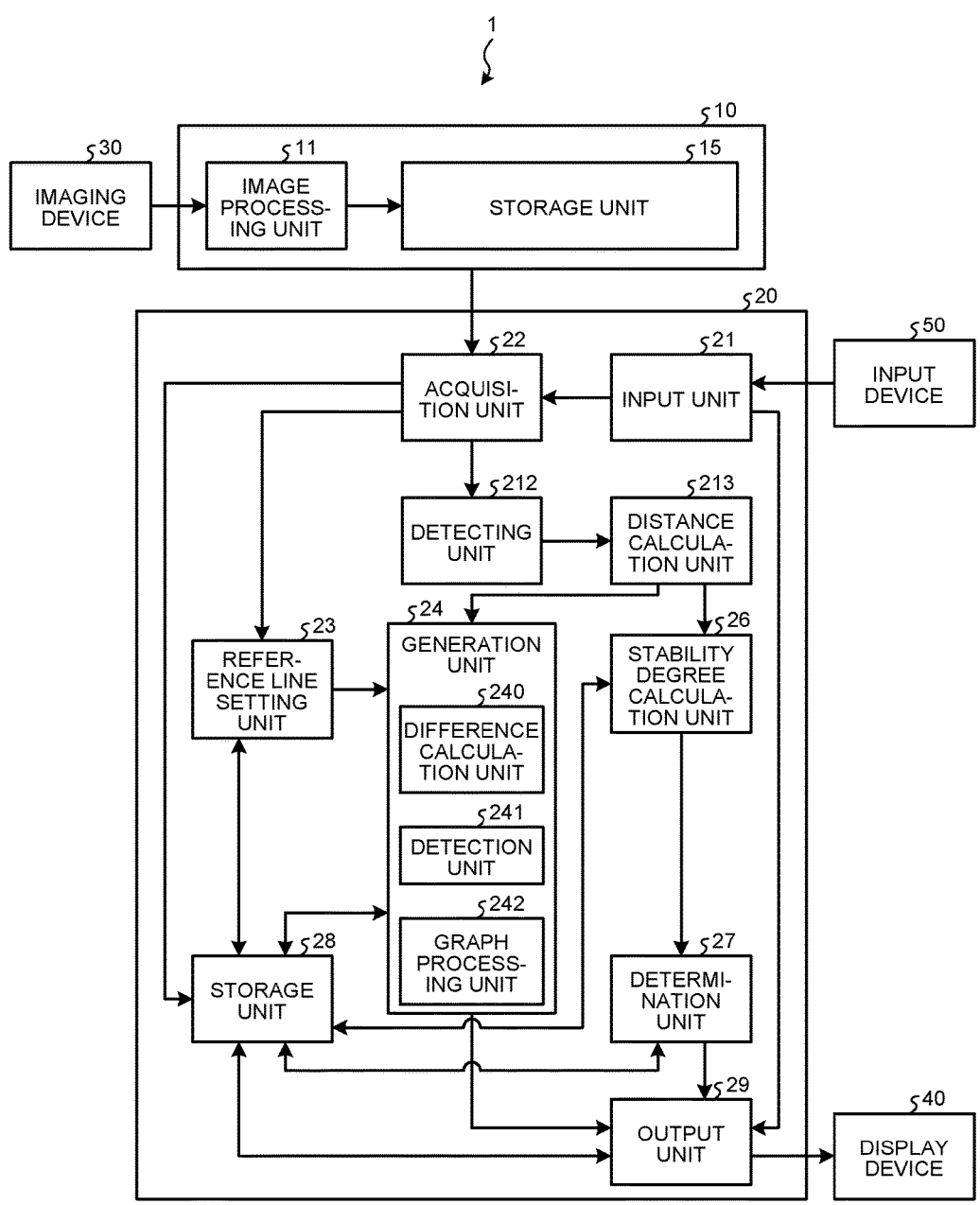
FIG. 14 is a diagram illustrating variation 3 of the present embodiment.

Variations of the present embodiment will be described by using FIG. 12, FIG. 13, and FIG. 14. FIG. 12 is a diagram illustrating variation 1 of the present embodiment and FIG. 13 is a diagram illustrating variation 2 of the present embodiment. FIG. 14 is a diagram illustrating variation 3 of the present embodiment.

6. 1. Variation 1

In the embodiment described above, a case where the difference calculation unit 240 of the information presentation device 20 calculates the difference d based on the right edge distance DR and the left edge distance DL that are included in information of a driving history has been described, and is not limited thereto.

For example, in a case where a width $DW_1$ of the vehicle C and a width $DW_2$ of the driving lane LD are known as illustrated in FIG. 12, the difference d can be calculated based on one of such widths $DW_1$ and $DW_2$ and the right edge distance DR and the left edge distance DL. Hereinafter, for sake of simplicity of a description, the difference d can be calculated based on the left edge distance DL among the right edge distance DR and the left edge distance DL.

In this case, the difference calculation unit 240 provides the difference d that is a value provided in such a manner that, for example, a value DW that is provided by adding a value $DW_1/2$ provided by dividing the width $DW_1$ into two halves and the left edge distance DL ($DW=DW_1/2+DL$) is subtracted from a value $DW_2/2$ provided by dividing the width $DW_2$ of the driving lane LD into two halves. That is, the difference d is $d=DW_2/2-DW_1/2-DL$.

Thus, a method for calculating the difference d between the driving reference line Pth defined in the driving lane LD and the driving position PD of the vehicle C is not limited to a method based on the left edge L1 and the right edge L2 of the driving lane LD. For example, the difference d between the center line PC of the driving lane LD and the driving position PD may be calculated based on the width $DW_1$ of the vehicle C and the width $DW_2$ of the driving lane LD.

The width $DW_1$ of the vehicle C is a value that is determined depending on the vehicle C with the on-vehicle device 10 mounted thereon, and is preliminarily stored in the storage unit 28. The width $DW_2$ of the driving lane LD may be calculated based on, for example, the captured image P, or information with respect to the width $DW_2$ of the driving lane LD may be acquired from an external device, by acquiring map information of a navigation device (not illustrated) or the like.

6. 2. Variation 2

Although a case where the information presentation device 20 includes the reference line setting unit 23 and the difference calculation unit 240 has been described in the embodiment described above, for example, the on-vehicle device 10 may include a difference calculation unit 14 and a reference line setting unit 16 as illustrated in FIG. 13.

The information presentation system 1 according to the present variation 2 illustrated in FIG. 13 is identical to the information presentation system 1 illustrated in FIG. 3 except that the on-vehicle device 10 includes the difference calculation unit 14 and the reference line setting unit 16, and hence, identical reference numerals will be provided to omit descriptions thereof.

As illustrated in FIG. 13, the on-vehicle device 10 further includes the difference calculation unit 14 and the reference line setting unit 16. The reference line setting unit 16 set the driving reference line Pth at a position in the driving lane LD depending on at least one of information with respect to the vehicle C and information with respect to the driving lane LD, similarly to the reference line setting unit 23 in FIG. 3. The reference line setting unit 16 outputs the set driving reference line Pth to the difference calculation unit 14. The information with respect to the vehicle C and information with respect to the driving lane LD are preliminarily stored in, for example, the storage unit 15.

In a case where the reference line setting unit 16 sets the driving reference line Pth at the center line PC of the driving lane LD (see FIG. 6), the difference calculation unit 14 subtracts the left edge distance DL from the right edge distance DR to calculate the difference d, similarly to the difference calculation unit 240 in FIG. 3. Thus, the difference calculation unit 14 operates as a history generation unit that generates information of a driving history of the vehicle C based on the difference d of the right edge distance DR from the left edge distance DL.

On the other hand, in a case where the driving reference line Pth is set to be shifted by the distance D3 from the center line PC of the driving lane LD toward a side of a left edge thereof (see FIG. 6), the difference calculation unit 14 calculates the difference d1 provided in such a manner that the difference d calculated by subtracting the left edge distance DL from the right edge distance DR is shifted by the distance D3. For example, the difference calculation unit 14 adds the distance D3 to the difference d to calculate the difference d1 ($d1=d+D3$). The difference calculation unit 14 stores the calculated difference d or difference d1 as information of a driving history in the storage unit 15.

Thus, the on-vehicle device 10 is provided with the difference calculation unit 14 and the reference line setting unit 16, and thereby, the difference calculation unit 240 and the reference line setting unit 23 can be omitted in the information presentation device 20. For generation of information of a graph that is executed by the generation unit 24 of the information presentation device 20, a process of calculation of the difference d or d1 by the difference calculation unit 240 can be omitted. Thereby, a process of the information presentation device 20 can be reduced.

6. 3. Variation 3

Although a case where the on-vehicle device 10 detects the left and right edges L1 and L2 of the driving lane LD has been described in the embodiment and variations described above, the information presentation device 20 detects the left and right edges L1 and L2 of the driving lane LD from the captured image Pn, for example, as illustrated in FIG. 14.

The information presentation system 1 according to the present variation 3 illustrated in FIG. 14 is identical to the information presentation system illustrated in FIG. 4 except that the information presentation device 20 includes a detecting unit 212 and a distance calculation unit 213, and hence, identical reference numerals will be provided to omit descriptions thereof.

The acquisition unit 22 illustrated in FIG. 14 acquires, for example, the captured image Pn as information of a driving history of the vehicle C. The acquisition unit 22 outputs the acquired information of a driving history to the reference line setting unit 23 and the detecting unit 212.

The detecting unit 212 detects the left edge L1 and the right edge L2 of the driving lane LD for each predetermined period or predetermined distance, based on the captured image Pn, similarly to the detecting unit 12 in FIG. 3. The detecting unit 212 outputs the detected left and right edges L1 and L2 to the distance calculation unit 213.

The distance calculation unit 213 calculates the left and right edge distances DL and DR of the driving lane LD at the time Tn, based on a position of the left edge L1 and the right edge L2 of the driving lane LD that are detected by the detecting unit 212, on the captured image Pn, similarly to the distance calculation unit 13 in FIG. The distance calculation unit 213 outputs the calculated left and right edge distances DL and DR to the generation unit 24 and the stability degree calculation unit 26.

The difference calculation unit 240 calculates the difference d based on the left and right edge distances DL and DR that are calculated by the distance calculation unit 213, and the stability degree calculation unit 26 calculates a degree of stability of driving of the vehicle C in the driving lane LD based on the left and right edge distances DL and DR that are calculated by the distance calculation unit 213.

Thus, the information presentation device 20 is provided with the detecting unit 212 and the distance calculation unit 213, and thereby, the detecting unit 12 and the distance calculation unit 13 can be omitted in the on-vehicle device 10. Thereby, a process of the on-vehicle device 10 can be reduced.

Although a case where the reference line setting unit 16 of the on-vehicle device 10 or the reference line setting unit 23 of the information presentation device 20 sets the driving reference line Pth has been described in the embodiment and variations described above, for example, a user may set the driving reference line Pth through the input device 50.

Although a case where the information presentation device 20 outputs information of a graph to the display device 40 has been described in the embodiment and variations described above, for example, the information presentation device 20 may be mounted on the on-vehicle device 10 to output information of a graph to a display unit (not illustrated) of the on-vehicle device 10.

Although a case of left-hand traffic where a vehicle operates, in principle, on a left side of a road from a center thereof has been described in the embodiment and variations described above, right-hand traffic where a vehicle operates on a right side thereof may be applied thereto. In such a case, for example, in a case where the driving reference line Pth is shifted and set, the reference line setting unit 23 does not set the left edge L1 but shifts to the right edge L2. That is, the reference line setting unit 23 sets the driving reference line Pth on a more right side of the driving lane LD.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information presentation device, comprising a processor:

the processor programmed to:

set a driving reference line at a position in a driving lane of a vehicle in accordance with (i) information on the driving lane and (ii) information on the vehicle that is driving in the driving lane, the information on the vehicle including a width of the vehicle;

acquire, based on one of a center line, a boundary line, and an outer line that are applied on a road, information on a driving history with respect to a driving position in the driving lane of the vehicle, the information on the driving history being generated by an on-vehicle device based on an image captured by an imaging device that is mounted on the vehicle, and the driving history including (i) a first distance from the vehicle to a right edge of the driving lane and (ii) a second distance from the vehicle to a left edge of the driving lane;

calculate a driving stability degree based on the acquired information of the driving history;

generate information on a graph that indicates a transition of a positional change of the vehicle in the driving lane, based on a difference between the first and second distances included in the acquired information on the driving history; and output the generated information on the graph to a display device.

2. The information presentation device according to claim 1, wherein the processor is further programmed to:

detect an interval where the driving position in the driving lane for the vehicle cannot be detected, based on the acquired information on the driving history; and generate information on the graph except the transition, of the positional change of the vehicle, in the detected interval.

3. The information presentation device according to claim 1, wherein the processor is further programmed to generate, as the information on the graph, information on a graph that indicates a relationship between (i) positions of the vehicle in its left and right directions from the driving reference line defined substantially at a center of the driving lane and (ii) a driving time period or a driving distance of the vehicle, based on the acquired information of the driving history.

4. The information presentation device according to claim 1, wherein, the processor is programmed to calculate the driving stability degree, of the vehicle in the driving lane, for the driving lane, based on the acquired information of the driving history.

5. The information presentation device according to claim 4, wherein the processor is further programmed to:

calculate the driving stability degree for each of a plurality of vehicles including the vehicle; and determine a rank of the plurality of vehicles depending on the calculated driving stability degrees.

6. An information presentation system, comprising an on-vehicle device and an information presentation device, wherein:

the on-vehicle device includes a storage unit that sequentially generates, and stores as information on a driving history, information on the vehicle for a driving position in a driving lane thereof, based on an image captured by an imaging device that is mounted on the vehicle; and the information presentation device comprising a processor:

the processor programmed to:

set a driving reference line at a position in the driving lane of the vehicle in accordance with (i) information on the driving lane and (ii) information on the vehicle that is driving in the lane, the information on the vehicle including a width of the vehicle;

acquire, based on one of a center line, a boundary line, and an outer line that are applied on a road, the information on the driving history with respect to the driving position in a driving lane of the vehicle, the driving history including (i) a first distance from the vehicle to a right edge of the driving lane and (ii) a second distance from the vehicle to a left edge of the driving lane;

calculate a driving stability degree based on the acquired information of the driving history;

generate information on a graph that indicates a transition of a positional change of the vehicle in the driving lane, based on a difference between the first and second distances included in the acquired information on the driving history; and output the generated information on the graph to a display device.

7. An information presentation method, comprising:

a setting step that sets a driving reference line at a position in a driving lane of a vehicle in accordance with (i) information on the driving lane and (ii) information on the vehicle that is driving in the driving lane, the information on the vehicle including a width of the vehicle;

a history generation step that generates, based on one of a center line, a boundary line, and an outer line that are applied on a road, information on a driving history with respect to a driving position in the driving lane of the vehicle based on an image captured by an imaging device that is mounted on the vehicle, the driving history including (i) a first distance from the vehicle to a right edge of the driving lane and (ii) a second distance from the vehicle to a left edge of the driving lane;

an acquisition step that acquires the information on the driving history generated in the history generation step;

a calculation step that calculates a driving stability degree based on the acquired information of the driving history;

a generation step that generates information on a graph that indicates a transition of a positional change of the vehicle in the driving lane, based on a difference between the first and second distances included in the information on the driving history acquired in the acquisition step; and an output step that outputs the information on the graph generated in the generation step to a display device.

* * * * *